United States Patent
Tarvin et al.

(10) Patent No.: US 11,573,126 B2
(45) Date of Patent: Feb. 7, 2023

(54) METHOD AND SYSTEM TO TRIM ASPHALT THERMAL MAPPING DATA

(71) Applicant: Caterpillar Paving Products Inc., Brooklyn Park, MN (US)

(72) Inventors: Mark A. Tarvin, Canton, IL (US);
Jacob J. McAlpine, Otsego, MN (US);
John L. Marsolek, Watertown, MN (US); Sivakumar P. Shanmugasundaram, Chennai (IN)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 373 days.

(21) Appl. No.: 16/739,677

(22) Filed: Jan. 10, 2020

(65) Prior Publication Data
US 2021/0215542 A1 Jul. 15, 2021

(51) Int. Cl.
*G01J 5/10* (2006.01)
*G01J 5/00* (2022.01)
*E01C 19/48* (2006.01)
*G01J 5/48* (2022.01)

(52) U.S. Cl.
CPC ............. *G01J 5/10* (2013.01); *E01C 19/48* (2013.01); *G01J 5/485* (2022.01); *G01J 2005/0077* (2013.01)

(58) Field of Classification Search
None
See application file for complete search history.

(56) References Cited

U.S. PATENT DOCUMENTS

| 8,989,511 | B1* | 3/2015 | Leary | G06T 5/006 382/256 |
| 2016/0042235 | A1* | 2/2016 | Buschmann | E01C 23/01 348/148 |
| 2017/0322088 | A1* | 11/2017 | Becher | G01J 5/07 |
| 2019/0078270 | A1* | 3/2019 | Laugwitz | E01C 19/004 |

* cited by examiner

*Primary Examiner* — Erica S Lin
(74) *Attorney, Agent, or Firm* — Bookoff McAndrews, PLLC

(57) ABSTRACT

In one aspect, a method of determining lateral edges of an asphalt mat deposited by a paving machine includes obtaining thermal image data of the asphalt mat at a thermal measuring device associated with the paving machine, and determining, on the paving machine, the lateral edges of the asphalt mat based on a threshold temperature value and the thermal image data. Other aspects include a method of generating a thermal map of an asphalt mat formed by paving machine, and a system for determining lateral edges of an asphalt mat deposited by a paving machine.

20 Claims, 5 Drawing Sheets

METHOD AND SYSTEM TO TRIM ASPHALT THERMAL MAPPING DATA

TECHNICAL FIELD

The present disclosure relates generally to a methods and systems for generating thermal mapping data of asphalt mats, and more particularly to methods of trimming thermal mapping data of an asphalt mat.

BACKGROUND

Thermal mapping data of asphalt mats deposited by paving machines is used to assess uniformity of the asphalt mats in terms of compaction and density, and to verify an actual size of the asphalt mats. Irregularities in compaction and density may occur if, for example, ambient temperature or a temperature of a paving machine are cold or the paving material supply has a varied temperature. Maintaining compaction uniformity ensures a reduction of cracks in the asphalt mat, which can lead to pot holes if and when water flows into those cracks. Maintaining compaction uniformity also ensures a reduction of streaks in the asphalt mat. Maintaining density uniformity ensures a reduction of soft spots in the asphalt mat which also can lead to cracks and pot holes. Setting levels of compaction uniformity and density uniformity of the asphalt mat helps to ensure longevity of the asphalt mat.

In addition, thermal mapping data of asphalt mats may be required and used by local or governmental agencies to ensure compliance with specifications of construction contracts. For example, a local agency or a governmental agency may require transmission of thermal mapping data for each lot (i.e., a rectangular area of deposited asphalt, the area being of a predetermined width and a predetermined length) deposited by a paving machine. The thermal data to be transmitted may be required to conform to specifications of a construction contract issued by the agency. If the transmitted thermal mapping data indicates a density uniformity of less than 85%, for example, the agency may reduce payment on the construction contract.

Known thermal profiling systems record thermal data within a field of view of a thermal measuring device, such as a thermal camera or a thermal line scanner. These thermal profiling systems capture wanted data, i.e., temperature values of a hot asphalt mat, as well as unwanted data, i.e., temperature values along the sides of the asphalt mat, as wide as the thermal measuring device can record. The unwanted thermal data increases the amount of data that must be stored, and requires a user to post-process the data with a third party application (such as Veta) to remove the unwanted data so that the temperatures of the hot asphalt mat can be analyzed.

Such post-processing may also require the user to determine the edges of the asphalt map before performing the trimming of the thermal mapping data. To that end some paving devices include sensors provided on outer edges of a screed to measure a width of the asphalt map. A problem occurs, however, when only a portion (i.e., one side) of a paving device is used to deposit asphalt, i.e., a reduced width asphalt mat is formed, as is the case when paving a culde-sac or a merging area of a road. When sensors are provided at each end of a screed of a paving device, the sensors may not reflect an actual width of such a reduced width asphalt mat. These paving devices, therefore, require a user to make further adjustments to the thermal data by deleting data for those areas outside the edges of the reduced width asphalt mat.

In addition, when a paving device obtains infrared (IR) data of an asphalt mat using an infrared (IR) sensor, IR data is obtained for individual points on the asphalt mat while the paving machine moves. The IR data obtained may not be captured along a true line, i.e., a line that is perpendicular to an axis along which the paving machine moves, and that spans a width of the asphalt mat. In addition, if a speed of the paving machine increases, the IR sensor may not necessarily increase a frequency of capturing the IR data and IR data, therefore, may be lost. As a result, thermal data output by such a paving device may not necessarily include all of the thermal data of the asphalt mat corresponding to a lot (i.e., a rectangular area), and may be incomplete.

The method of trimming thermal mapping data of asphalt mats according to the present disclosure may solve one or more of the problems set forth above and/or other problems in the art. The scope of the current disclosure, however, is defined by the attached claims, and not by the ability to solve any specific problem.

SUMMARY

In one aspect, a method of determining lateral edges of an asphalt mat deposited by a paving machine may include obtaining thermal image data of the asphalt mat at a thermal measuring device associated with the paving machine, and determining, on the paving machine, the lateral edges of the asphalt mat based on a threshold temperature value and the thermal image data.

In another aspect, a method of generating a thermal map of an asphalt mat formed by paving machine may include generating thermal image data of the asphalt mat at a thermal measuring device associated with the paving machine, the thermal image data including a plurality of scan lines of thermal image data across a field of view of the thermal measuring device, determining, on the paving machine, based on the plurality of scan lines and a threshold temperature value, lateral edges of the asphalt mat, and generating the thermal map of the asphalt mat, the thermal map including the thermal image data, of the plurality of scan lines, between the lateral edges of the asphalt mat.

In still another aspect, a system for determining lateral edges of an asphalt mat deposited by a paving machine may include a thermal measuring device configured to acquire a thermal image of the asphalt mat, the thermal image including thermal image data of the asphalt mat, at least one memory storing a set of instructions, and at least one processor configured to execute instructions of the set of instructions to determine, on the paving machine, the lateral edges of the asphalt mat based on a threshold temperature value and the thermal image data.

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "generally, "substantially," and "approximately" are used to indicate a possible variation of ±10% in the stated value.

DETAILED DESCRIPTION

Figure 1:
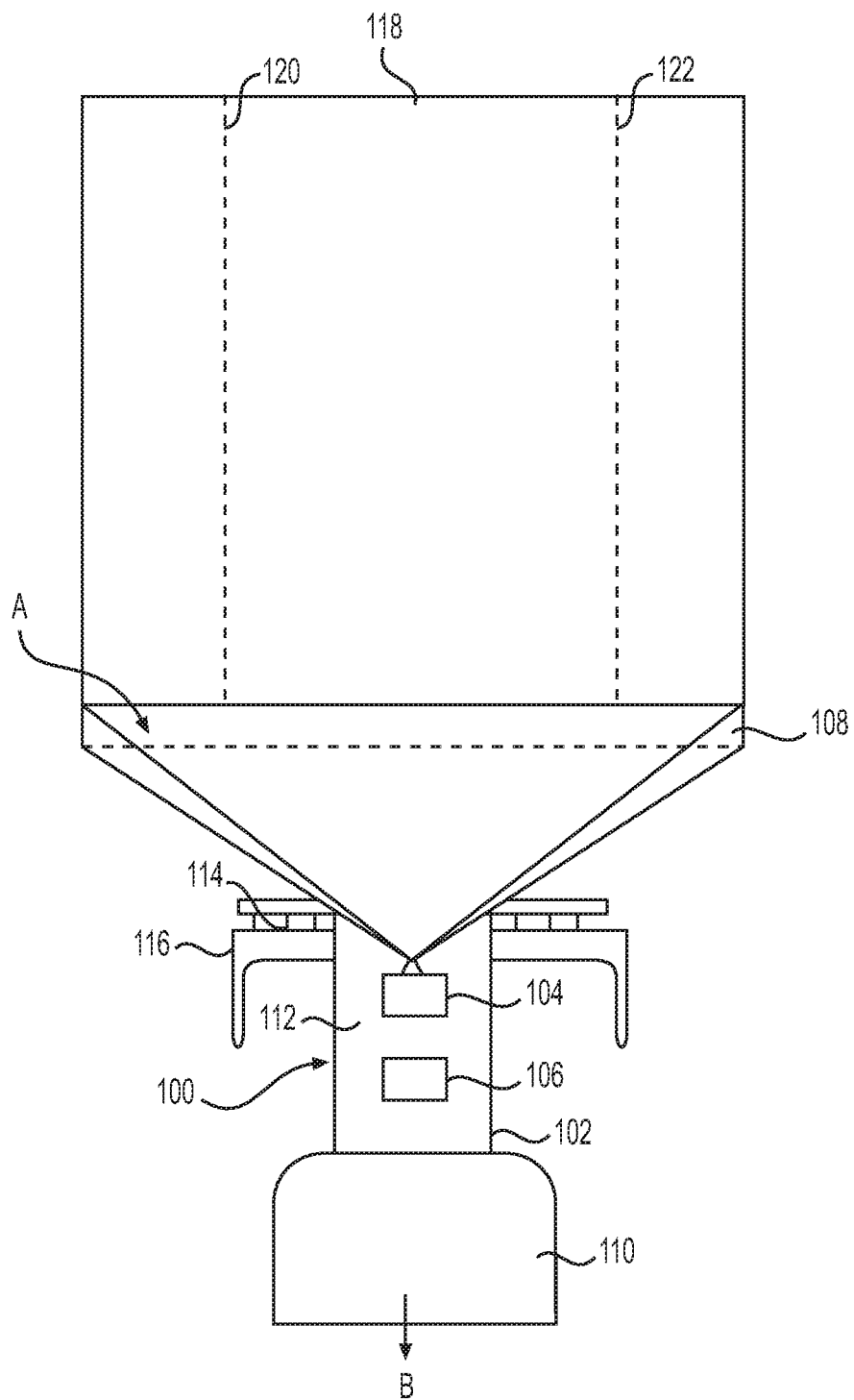
FIG. 1 shows a schematic diagram of a paving device and an asphalt mat, in accordance with the present disclosure.

Referring to FIG. 1, a thermal mapping system 100 for a paving device 102 includes at least a thermal measuring device 104 and a controller 106. The paving device 102 may be any conventional paving device or machine, and may include a hopper 110, a cab 112, at least one auger 114, and a screed 116. The thermal measuring device 104 and the controller 106 may be installed on the paving device 102. The thermal measuring device 104 may be an optical temperature sensor, such as a thermal camera or a thermal line scanner, that uses infrared radiation to capture a thermal image. The thermal measuring device 104 has a field of view 108, and is shown mounted on the cab 112 of the paving device 102 in an orientation in which the thermal measuring device 104 is configured to capture thermal data for each scan line A of an asphalt mat 118 deposited on a work surface located behind the screed 106 as the paving device 102 progresses. That is, as the paving device 102 progresses along a work surface in the direction shown by arrow B in FIG. 1, the thermal measuring device 104 faces in an opposite direction relative to arrow B, and captures thermal data for each scan line A of the asphalt mat 118 to thereby obtain a plurality of scan lines A that form a full thermal map of the asphalt mat 118. The present disclosure is not, however, limited to such an arrangement of the thermal measuring device 104, and the thermal measuring device 104 may be mounted to other parts of the paving device 102 or may be held by a user. The paving device 102 forms the asphalt mat 118 having two opposite, lateral edges 120 and 122.

Figure 2:
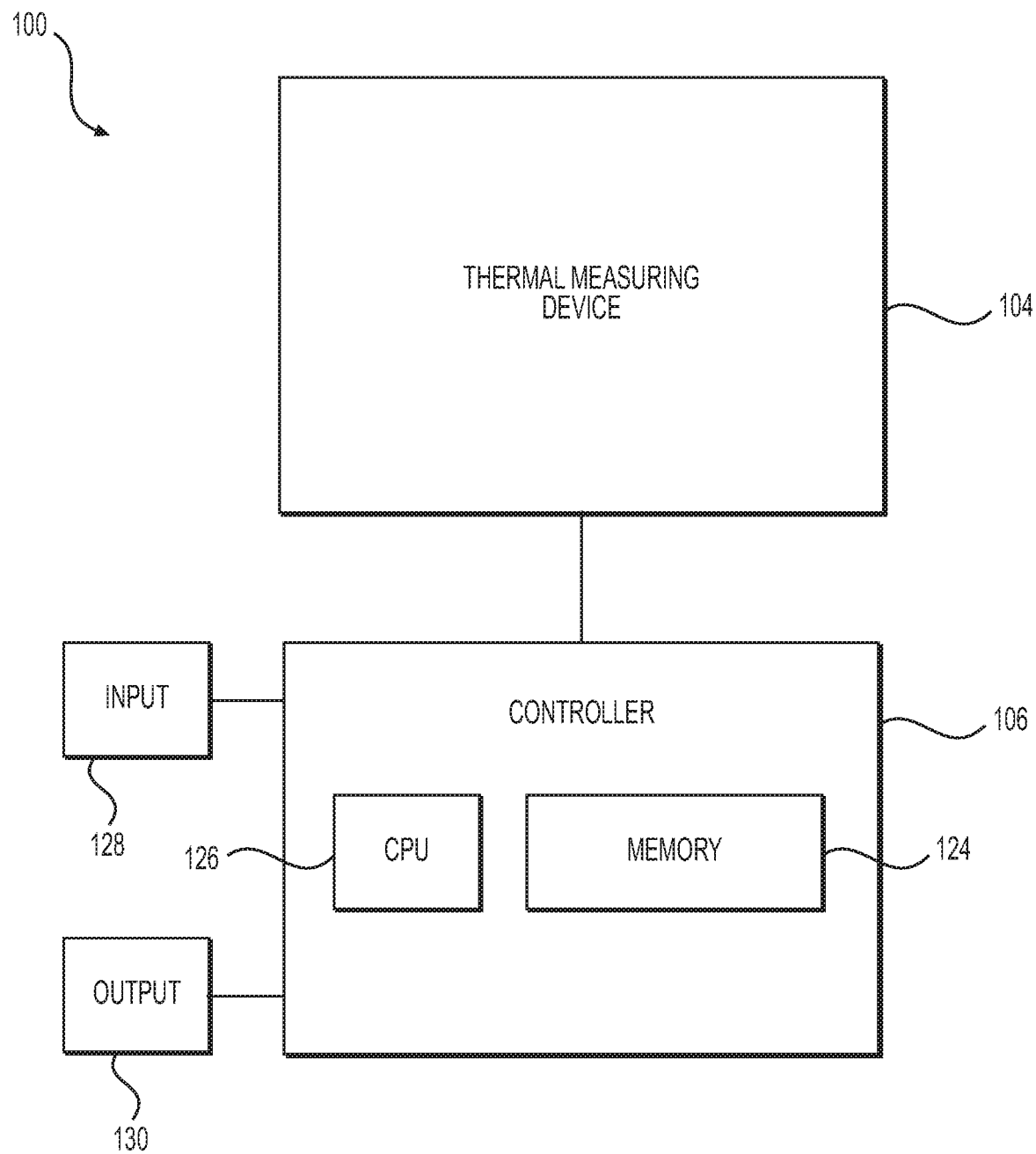
FIG. 2 shows a schematic diagram of a thermal measuring device and a controller of the paving device, in accordance with the present disclosure.

Referring to FIG. 2, the controller 106 includes at least one memory device 124 and at least one processor 126. The memory device 124 includes suitable logic, circuitry, interfaces, and/or code that may be configured to store the set of instructions, which are executed by the processor 126. In an embodiment, the memory device 124 may be configured to store one or more programs, routines, or scripts that may be executed in coordination with the processor 126 to perform the method 300, shown in FIGS. 3 and 4. The memory device 124 also stores threshold values, including a user defined temperature threshold value and a calculated temperature threshold value, which can be used the method 300. The memory device 124 may be a Random Access Memory (RAM), a Read-Only Memory (ROM), a Hard Disk Drive (HDD), a storage server, and/or a Secure Digital (SD) card.

Figure 3:
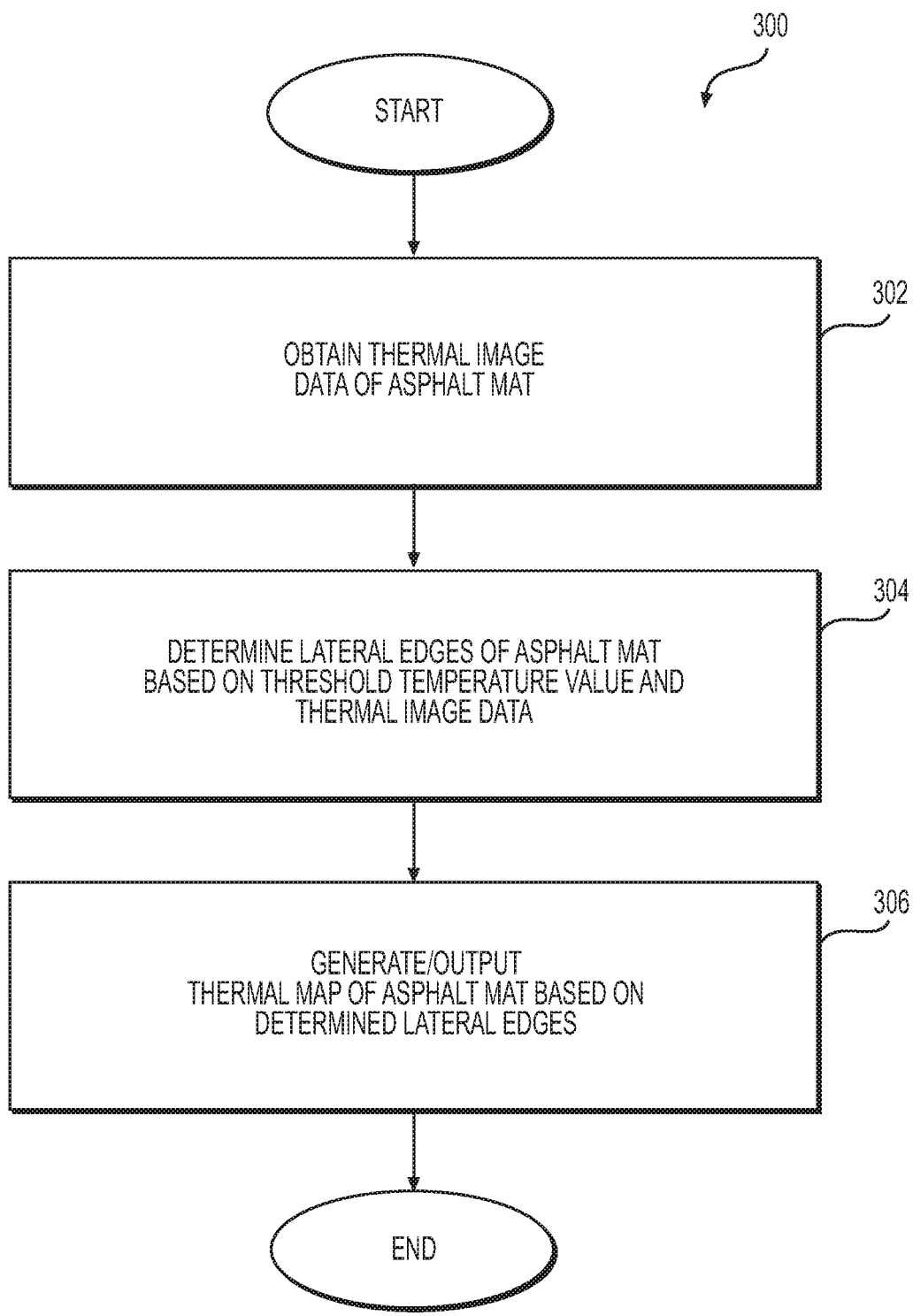
FIG. 3 shows a flowchart of a method of generating and outputting a thermal map of an asphalt mat, in accordance with the present disclosure.
Figure 4:
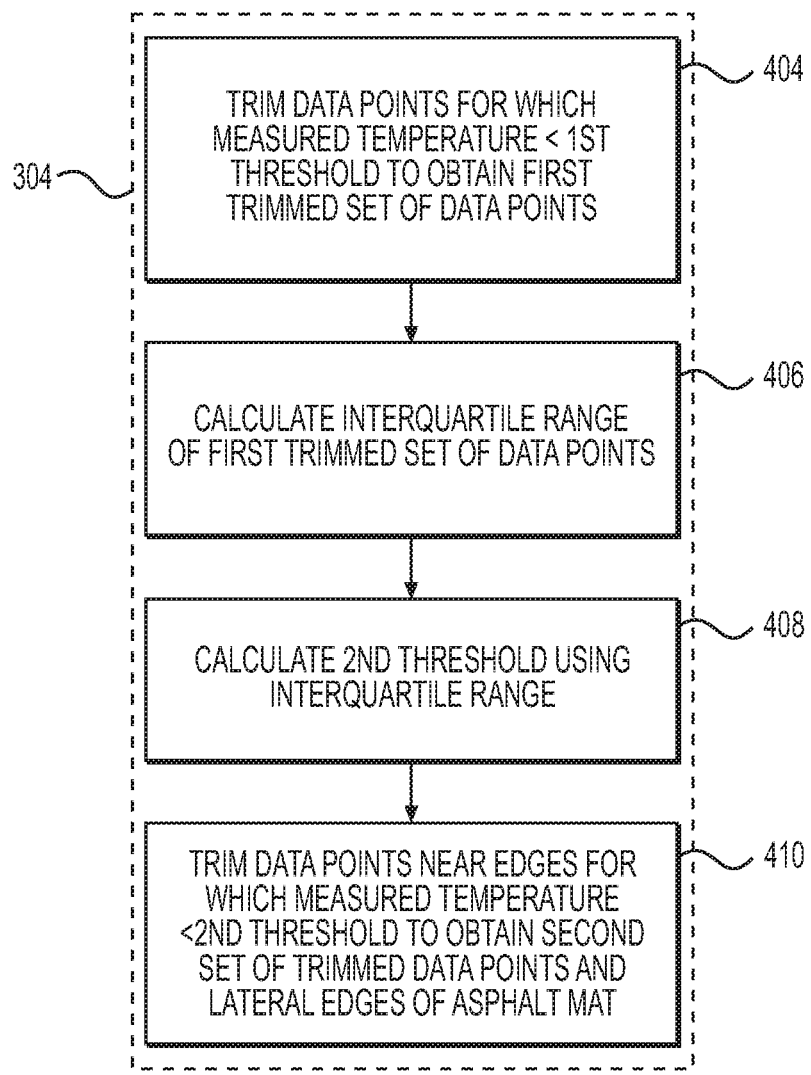
FIG. 4 shows details of a method of obtaining trimmed data points and lateral edges of an asphalt mat in accordance with the present disclosure.

The processor 126 reads and executes the set of instructions to perform the method 300, shown in FIGS. 3 and 4. The controller 106 is configured to control the operation of the thermal mapping system 100 based on the thermal image data output from the thermal measuring device 104, and the programs executed by the processor 126. The processor 126 may be a central processing unit (CPU), for example. The memory device 124 and the processor 126 and the are not, however, limited to the devices listed above.

The thermal mapping system 100, and, in particular, the controller 106 is configured to receive an input in any appropriate manner, and to provide outputs in any appropriate manner. For example, a user may provide inputs via an input device 128, such as a user interface on the paving device 102. For example, a user may input a user defined threshold temperature value T1 via the input device 128. Alternatively, the user may provide inputs remotely. In addition, the controller 106 may provide outputs via an output device 130, such as a display of the user interface, or to an interface located on a device that is remote from the paving device 102.

INDUSTRIAL APPLICABILITY

The thermal mapping system 100, and, in particular, the method executed by the controller 106 of the thermal mapping system 100, may provide trimmed thermal mapping data of an asphalt mat 118, while reducing or eliminating the need for manual adjustment or verification during trimming of the thermal mapping data.

FIGS. 3 and 4 show flowcharts for a method 300 executed by the controller 106 using thermal image data obtained using the thermal measuring device 104 of the thermal mapping system 100.

In particular, FIG. 3 describes the method 300 of generating and outputting a thermal map of asphalt mat 118. For example, in step 302, thermal image data is obtained using the thermal measuring device 104 and is provided, or transmitted, to the controller 106. In step 304, lateral edges 120 and 122 of the asphalt mat 118 are determined, and in step 306, the controller 106 generates and outputs a thermal map of the asphalt mat 118 based on the determined lateral edges of the asphalt mat 118.

Figure 5:
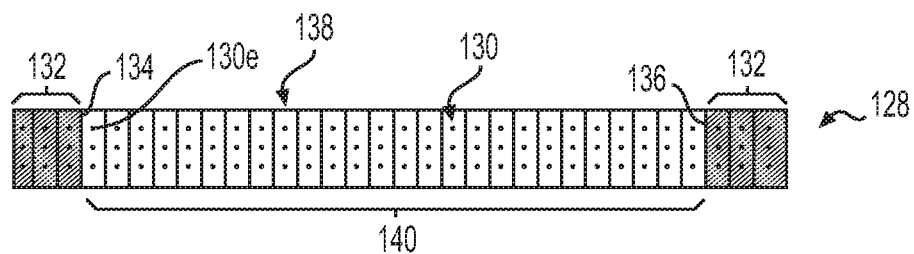
FIG. 5 shows a set of thermal mapping data, including data to be removed using a user defined temperature threshold.
Figure 6:
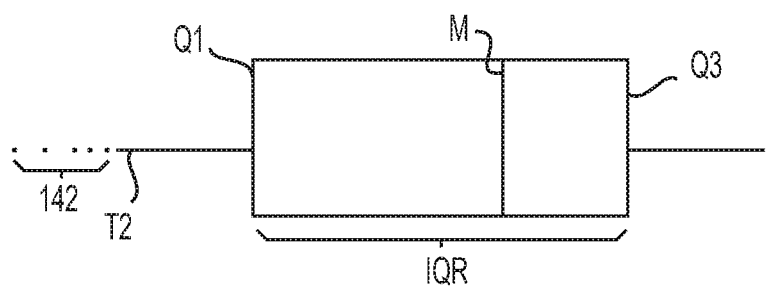
FIG. 6 shows a chart of thermal mapping data, depicting outlier values, a median value, a first quartile value, a second quartile value, and an interquartile range.

More specifically, in step 302, the thermal image data may be obtained by the thermal measuring device 104 and transmitted to the controller 106. Referring to FIG. 5, the thermal image data may be a thermal image 128 captured by the thermal measuring device 104. The thermal image data may include pixels 130, or data points, having pixel values, i.e., coordinate values of the pixels 130, and corresponding measured temperature values. The thermal image data may correspond to a plurality of scan lines A (FIG. 1), with each scan line A including pixels 130 having pixel values and corresponding measured temperature values.

The aspects of step 304 of FIG. 3 are provided in detail in FIG. 4. For example, step 304 may include a step 404, in which pixels 132, of the plurality of pixels 130 of the thermal image 128, are trimmed based on a relationship of the corresponding measured temperature values and a user defined threshold temperature value T1, to determine lateral edges 120 and 122 of the asphalt mat 118. That is, in step 304, the lateral edges 120 and 122 of the asphalt mat 118 are determined based on a threshold temperature value T1 and the thermal image data This step may include a pixel analysis, in which a measured temperature value of each pixel 130 of the obtained thermal image 128 is compared to the user defined threshold temperature value T1. This step may also include identification and trimming of pixels 130 for which a measured temperature value is less than the user defined threshold temperature value T1. That is, starting from each edge of the thermal image 128 of a scan line A, the measured temperature value of each pixel 130 is compared to the user defined threshold temperature value T1. If the measured temperature value of the pixel 130 is less than the user defined threshold temperature value T1, the pixel 130 is deleted (i.e., it is trimmed), and is referred to as a trimmed pixel 132. The comparison of the measured temperature values may be performed beginning from the edges of the thermal image 128 until the measured temperature value of a pixel 130 is greater than or equal to the user defined threshold temperature value T1, i.e., the pixel is an edge pixel 130e. Such a pixel 130e defines edges 134 and 136 of an initial trimmed thermal image 138, as shown in FIG. 5. The pixels outside of the edge pixels 130e are trimmed, i.e., they are trimmed pixels 132. The resulting initial trimmed thermal image 138 differs from the thermal image 128 in that trimmed pixels 132, i.e., the pixels for which the measured temperature values are less than the user defined threshold temperature value T1, are removed, and the initial trimmed thermal image 138 only includes remaining pixels 140.

Next, in step 406, an interquartile range (IQR) of the temperature values for the pixels 140 in the initial trimmed thermal image 138 is calculated. In this step, a first quartile value Q1 (i.e., a 25th percentile), a second quartile value, or a median M, and a third quartile value Q3 (i.e., a 75th percentile) of the temperature values for the pixels 140 are calculated. More specifically, a list of the temperature values for the pixels 140 in the initial trimmed thermal image 138, in increasing order from a lowest value to a greatest value, is generated. If an odd number of temperature values is included in the list, the median M is the middle value in the list. If an even number of temperature values is included in the list, the median M is the average of the two middle values in the list.

Temperature values less than the median M form a lower half of the list. The first quartile value Q1 is a middle value of the lower half of the list, and the third quartile value Q3 is a middle value of the upper half of the list. If the lower half of the list contains an odd number of temperature values, then the first quartile value Q1 is the middle value of the lower half of the list. If the lower half of the list contains an even number of temperature values, then the first quartile value Q1 is an average of the two middle values of the lower half of the list.

Similarly, temperature values greater than the median M form the upper half of the list if the upper half of the list contains an odd number of temperature values, then the third quartile value Q3 is the middle value of the upper half of the list. If the upper half of the list contains an even number of temperature values, then the third quartile value Q3 is an average of the two middle values of the upper half of the list. The IQR is equal to the difference between the first quartile value Q1 and the third quartile value Q3, as shown in FIG. 5. That is, IQR=Q3−Q1.

In step 408, another threshold temperature value T2 (i.e., a calculated or a second threshold temperature value) is calculated. The calculated threshold temperature value T2 may be determined based on the first quartile value Q1 and the IQR. For example, the calculated threshold temperature value T2 may be calculated using the following equation:

$$T2 = Q1 - 1.5 \times IQR.$$

In step 410, the pixels 140 of the initial trimmed thermal image 138 are trimmed, as part of a pixel analysis, based on a relationship of the corresponding measured temperature values and the calculated threshold temperature value T2. More specifically, starting from each end of the initial trimmed thermal image 138, the measured temperature value of each pixel 140 is compared to the calculated threshold temperature value T2. If the measured temperature value of the pixel 140 is less than the calculated threshold temperature value T2, the pixel 140 is deleted (i.e., it is a trimmed pixel 142).

Figure 7:
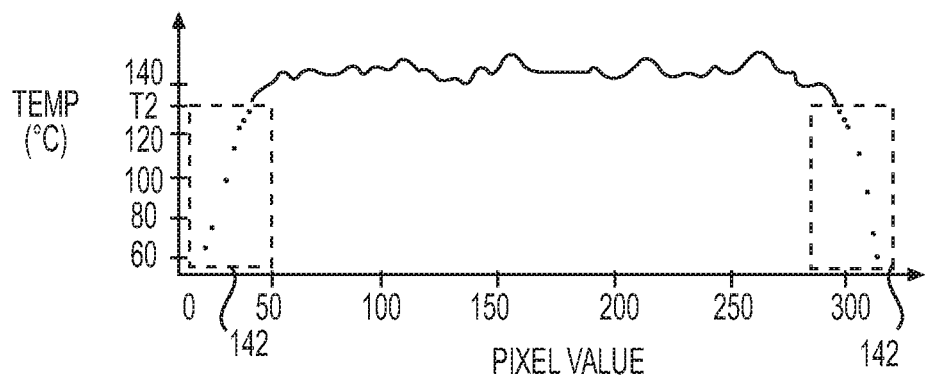
FIG. 7 shows a graph of temperatures and pixel values of the thermal mapping data.
Figure 8:
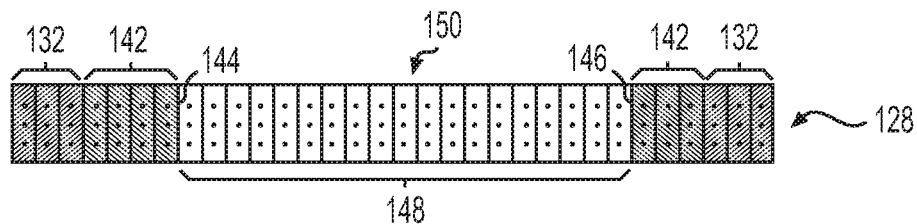
FIG. 8 shows a set of thermal mapping data, including the data to be removed using the user defined temperature threshold and data to be removed using the temperature threshold determined using an interquartile range.

FIG. 7 shows a graph of measured temperature values and pixel values of the thermal image 142. As shown in FIG. 7, trimmed pixels 142 are those pixels for which the measured temperature value is less than the calculated threshold temperature value T2. The trimmed pixels 142 correspond to pixels 140 at the edges of the thermal image 138, i.e., pixels 140 having pixel values near one of the two edges 134 and 136 of the thermal image 138. The final trimmed thermal image 150 differs from the initial trimmed thermal image 138 in that the pixels 142 for which the measured temperature values are less than the calculated threshold temperature value T2 are removed, and the final trimmed thermal image 150 only includes the remaining pixels 148. Edges of the remaining pixels 148 define edges 144 and 146 of a final trimmed thermal image 150, as shown in FIG. 8. The edges 144 and 146 of the final trimmed thermal image 150 correspond to the lateral edges 120 and 122 of the asphalt mat 118. Step 304 then ends.

Next, referring back to FIG. 3, in step 306 a thermal map of the asphalt mat 118 is generated and/or output. That is, after the lateral edges 120 and 122 of the asphalt mat 118 are determined using the user defined threshold temperature value T1 and the calculated threshold temperature value T2 in step 304, a thermal map of the asphalt mat 118 may be generated. In particular, generation of the thermal map may include outputting the final trimmed thermal image 150, determined in step 304, to output device 130. The final trimmed thermal image 150 has a width and a length corresponding to a width and a length of a thermal map of the asphalt mat 118. The final trimmed thermal image 150 constitutes a thermal map of an asphalt mat 118. The outputting of the thermal map may include, for example, outputting the thermal map to a database of the user for transmission to an agency for analysis of the thermal map, or outputting the thermal map directly to a database of the agency for analysis. Then, the method 300 ends.

Although the method 300 is described as including steps 302 to 306, including the detailed steps 404 to 410 of step 304, the method 300 need not include all of these steps. For example, the method 300 may only include step 302, in which the thermal image 128 is obtained, step 404, as part of step 304, in which measured temperature values of pixels 130 in the thermal image 128 that are less than a user defined threshold value T1 are trimmed to obtain a trimmed thermal image 138, and step 306, in which a thermal map is generated and/or output. In such an embodiment, the thermal map is formed by the initial trimmed thermal image 138.

In addition, although the pixel analyses of steps 404 and 410 are described as starting from each end of the thermal image 128 or the initial trimmed thermal image 138, respectively, the pixel analyses of both steps may include a comparison of measured temperature values for every pixel 130 of every scan line A of the thermal image 128 or the initial trimmed thermal image 138, respectively. The pixel analysis of this embodiment stops when all pixels 130 have been subjected to the comparison.

The embodiments of the present disclosure encompass methods in which lateral edges of an asphalt mat deposited by a paving machine are determined using a thermal image captured by a thermal measuring device and a threshold temperature value. In addition, the embodiments of the present disclosure encompass methods in which a thermal map of an asphalt mat formed by a paving machine is generated using thermal image data of the asphalt mat and a threshold temperature value. Further, the embodiments of the present disclosure encompass systems that determines lateral edges of an asphalt mat deposited by a paving machine using a thermal image captured by a temperature measuring device and a threshold temperature value, and/or that generates a thermal map of the asphalt mat using thermal image data of the asphalt mat and a threshold temperature value.

By virtue of the thermal mapping system and the related methods of the present disclosure, thermal mapping data, including lateral edges and/or thermal maps, of an asphalt mat deposited by a paving device may be obtained to verify an actual size of the asphalt mat and/or to analyze temperature values of the thermal mapping data, while eliminating unwanted data, i.e., temperature values along the sides of the asphalt mat. The systems and methods of the present disclosure may facilitate obtaining trimmed thermal image data with less required input and/or adjustments by a user before, during, or after obtaining thermal image data. In addition, the thermal mapping data obtained in accordance with the systems and methods of present disclosure may require less or no post-processing for subsequent analysis (i.e., the output data can be stored and processed by a third-party application without the need for modification from a user), which, in turn, may facilitate efficiencies in storing and transmitting the thermal mapping data to an agency. Further, the systems and methods of the present disclosure provide for obtaining thermal mapping data of asphalt mat that includes a complete set of data points along a true line, i.e., a line that is perpendicular to an axis along which the paving machine moves, thereby facilitating the accuracy and precision of the thermal mapping data. Still further, the systems and methods of the present disclosure provide an iterative analysis of measured temperature values that facilitates eliminating measured temperature values, i.e., unwanted data, for locations outside of the asphalt mat by using a user defined temperature threshold value and a calculated temperature threshold value based, in part, on an interquartile range.

It will be apparent to those skilled in the art that various modifications and variations can be made to the disclosed system without departing from the scope of the disclosure. Other embodiments of the system will be apparent to those skilled in the art from consideration of the specification and practice of the lift capacity system disclosed herein. It is intended that the specification and examples be considered as exemplary only, with a true scope of the disclosure being indicated by the following claims and their equivalents.

What is claimed is:

1. A method of determining lateral edges of an asphalt mat, deposited by a paving machine, using a pixel analysis, the method comprising:
   obtaining, using a thermal measuring device, thermal image data of the asphalt mat, the thermal measuring device being provided on the paving machine that deposited the asphalt mat, and facing in a direction opposite to a moving direction of the paving machine, and the thermal image data including pixels and having respective measured temperature values; and
   determining, on the paving machine, the lateral edges of the asphalt mat using the pixel analysis, the pixel analysis including:
      comparing, for each pixel starting from an edge of a thermal image, the respective measured temperature value of the pixel to a threshold temperature value,
      trimming, if the respective measured temperature value for the pixel is less than the threshold temperature value, the pixel from the thermal image, and
      repeating the comparing and trimming steps to determine edge pixels, which include pixels for which the respective measured temperature values are not less than the threshold temperature value, are identified, the edge pixels defining the lateral edges of the asphalt mat, to generate a trimmed thermal image of the asphalt mat.

2. The method of claim 1, wherein the lateral edges are opposite lateral edges of the asphalt mat.

3. The method of claim 1, wherein the threshold temperature value is a user defined temperature.

4. The method of claim 1, wherein the determining is further based on thermal image data across the width of the asphalt mat.

5. The method of claim 1, wherein the threshold temperature value is a first threshold temperature value and the trimmed thermal image is a first trimmed thermal image, and wherein the pixel analysis further includes:
   comparing, as a second comparing step, for each pixel starting from each end of the first trimmed thermal image, the respective measured temperature value to a second threshold temperature value, the second threshold temperature value being greater than the first threshold temperature value,
   trimming, as a second trimming step, if the respective measured temperature value for the pixel is less than the second threshold temperature value, the pixel from the first trimmed thermal image, and
   repeating the second comparing step and the second trimming step, to generate a second trimmed thermal image of the asphalt mat.

6. The method of claim 5, wherein the pixel analysis further includes calculating the second threshold temperature value using an interquartile range of the thermal image data for which the temperature is greater than or equal to the first threshold temperature value.

7. The method of claim 6, wherein the interquartile range of the thermal image data is equal to the difference between a first quartile value and a third quartile value of the thermal image data.

8. A method of determining lateral edges of an asphalt mat deposited by a paving machine, the method comprising:
   obtaining, using a thermal measuring device provided on the paving machine and facing in a direction opposite to a moving direction of the paving machine, thermal image data of the asphalt mat;

determining, on the paving machine, the lateral edges of the asphalt mat based on comparisons between a threshold temperature value and respective measured temperature values of the thermal image data; and removing, based on the comparisons, portions of the thermal image data corresponding to locations outside of the lateral edges of the asphalt mat, to produce trimmed thermal image data.

9. The method of claim 8, wherein the lateral edges are opposite lateral edges of the asphalt mat.

10. The method of claim 8, wherein the threshold temperature value is a user defined temperature.

11. The method of claim 8, wherein the determining includes a pixel analysis of the thermal image data.

12. The method of claim 8, wherein the determining is further based on thermal image data across the width of the asphalt mat.

13. The method of claim 8, wherein the lateral edges are selected based on a temperature greater than or equal to the threshold temperature value.

14. The method of claim 13, wherein the threshold temperature value is a first threshold temperature value, and wherein the lateral edges are further determined based on a temperature greater than or equal to a second threshold temperature value, the second threshold temperature value being greater than the first threshold temperature value.

15. The method of claim 14, further comprising calculating the second threshold temperature using an interquartile range of the thermal image data for which the temperature is greater than or equal to the first threshold temperature value.

16. The method of claim 15, wherein the interquartile range of the thermal image data is equal to the difference between a first quartile value and a third quartile value of the thermal image data.

17. The method of claim 8, further comprising generating, on the paving machine, a thermal map of the asphalt mat using the trimmed thermal image data.

18. The method of claim 17, further comprising outputting, to a monitoring system outside of the paving machine, the generated thermal map of the asphalt mat using an output device.

19. A method for generating trimmed thermal image data of an asphalt mat deposited by a paving machine, the method comprising:

obtaining, using a thermal measuring device provided on the paving machine that has deposited the asphalt mat, and facing in a direction opposite to a moving direction of the paving machine, thermal image data of the asphalt mat;

determining, using at least one processor, lateral edges of the asphalt mat based on a threshold temperature value and the thermal image data; and removing, using the at least one processor, pixels of the thermal image data corresponding to locations outside of the lateral edges of the asphalt mat that were determined using the threshold temperature data and the thermal image data; and generating trimmed thermal image data representing fewer pixels as compared to the thermal image data before the pixels are removed.

20. The method of claim 7, wherein the second threshold temperature value is equal to the different between the first quartile value and a product of a constant and the interquartile range.

* * * * *